United States Patent [19]
Faure et al.

[11] Patent Number: 6,067,043
[45] Date of Patent: May 23, 2000

[54] PULSE COMPRESSION RADAR

[75] Inventors: Alain Faure, Pins Justaret; Noël Suinot, Escalquens, both of France

[73] Assignee: Alcatel, Paris, France

[21] Appl. No.: 09/274,471

[22] Filed: Mar. 23, 1999

[30]     Foreign Application Priority Data

Mar. 23, 1998 [FR]  France ................................. 9803529

[51] Int. Cl.[7] ..................................................... G01S 7/40
[52] U.S. Cl. ......................... 342/174; 342/135; 342/202; 342/204
[58] Field of Search .................................... 342/174, 168, 342/169, 172, 196, 202, 203, 204, 189, 134, 135, 145, 159, 162

[56]                  References Cited

U.S. PATENT DOCUMENTS

| | | | |
|---|---|---|---|
| 5,329,284 | 7/1994 | Groenenboom et al. | 342/132 |
| 5,568,150 | 10/1996 | Taylor, Jr. et al. | 342/189 |
| 5,708,436 | 1/1998 | Loiz et al. | 342/25 |
| 5,808,580 | 9/1998 | Andrews, Jr. | 342/162 |

FOREIGN PATENT DOCUMENTS

| | | |
|---|---|---|
| 0 291 337 A2 | 11/1988 | European Pat. Off. |
| 2 473 184 | 7/1981 | France |
| 42 40 225 A1 | 6/1994 | Germany |

OTHER PUBLICATIONS

M. I. Skolnik, Introduction to Radar Systems, 1981, McGraw–Hill, Singapore, XP00208524, pp. 426–427.

N. Vincent et al., Spaceborne Rain radar Mission and Instrument Analysis, IGARSS 1996, International Geoscience And Remote Sensing Symposium Remote Sensing For A Sustainable Future, Lincoln, NE, May 28–31, 1996, vol. 1 pp. 279–281, XP000659601.

N. Vincent et al, "Pulse Compression with –65 DB Sidelobe Level for a Spaceborne Meteorological Radar", IGARSS 1996, International Geoscience And Remote Sensing Symposium Remote Sensing For A Sustainable Future, Lincoln, NE, May 28–31, 1996, vol. 1 pp. 490–492, XP00659613.

A. Netterstrom, "Using Digital Pre–Distortion to Compensate for Analog Signal Processing Errors" International Radar Conference, Arlington, May 7–10, 1990, pp. 243–248, XP000131186, Institute Of Electrical And Electronics Engineers.

"Polytime coding as a means of pulse compression", Fielding, J.E., Aerospace and Electronic Systems, IEEE Transactions on vol. 35 2, Apr. 1999, pp. 716–721, 1999.

"Unfocused SAR using a Next–Generation COoherent Radar Depth Sounder for measurement of Greenland ice sheet Thickness", Legarsky, J.; Gogineni, S.P., Geoscience and Remote Sensing Symposium Proceedings, 1998.IGARSS '98. 1998 IEEE International vol. 1, 1998.

"Gradient descent method for designing optimum radar signals", Skinner, B.J.; Donohoe, J.P.; Ingels, F.M.; Radar Conference, 1995., Record of the IEEE 1995 International, 1995, pp. 67–71, 1995.

*Primary Examiner*—John B. Sotomayor
*Attorney, Agent, or Firm*—Sughrue, Mion, Zinn, Macpeak & Seas, PLLC

[57]                  ABSTRACT

The invention concerns a method of synthesizing a replica used in the compression filter of pulse compression radar.

The replica is calculated from the spectrum of a required impulse response.

The required impulse response is preferably obtained from an analytical function, such as a sinc function or a weighted sinc function, and a template.

It is preferable to use calibration signals of the instrument to calculate the replica.

The invention also applies to synthetic aperture radar.

7 Claims, 4 Drawing Sheets

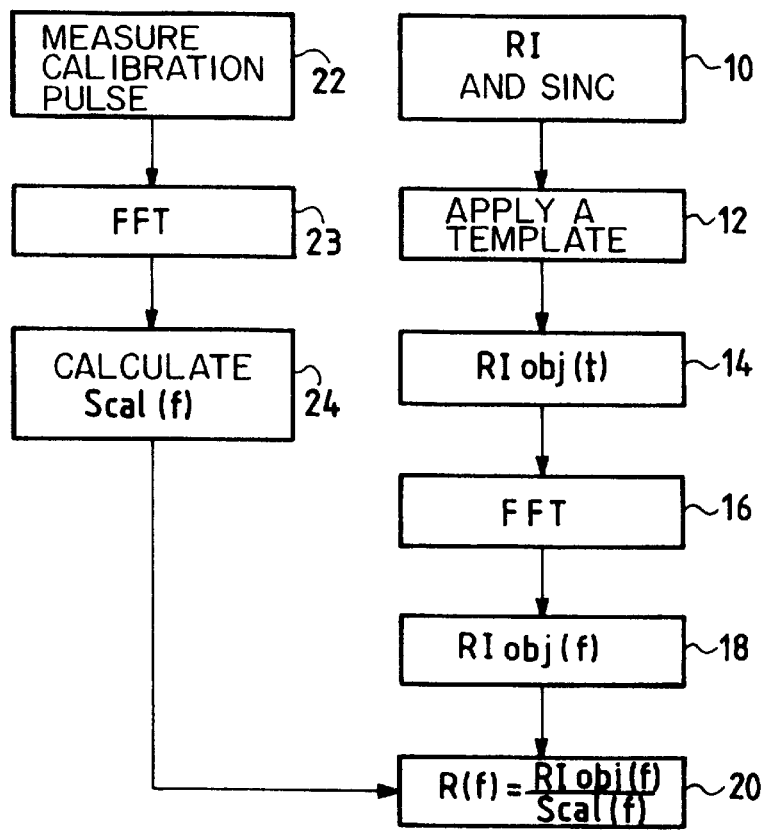
FIG_1
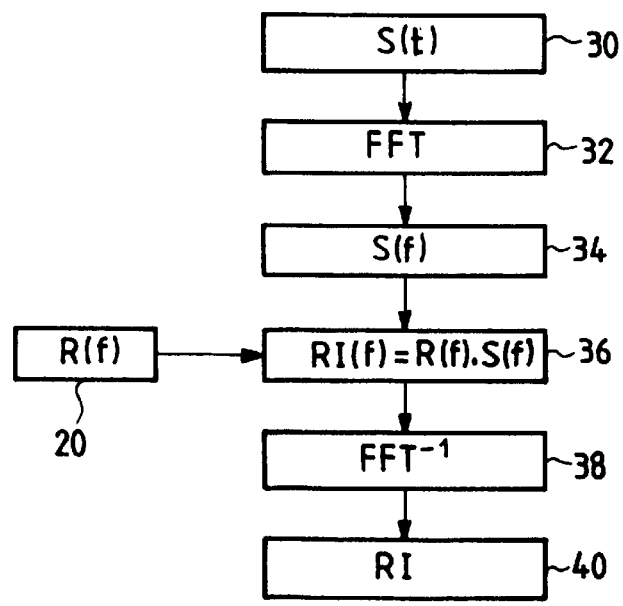
FIG_3

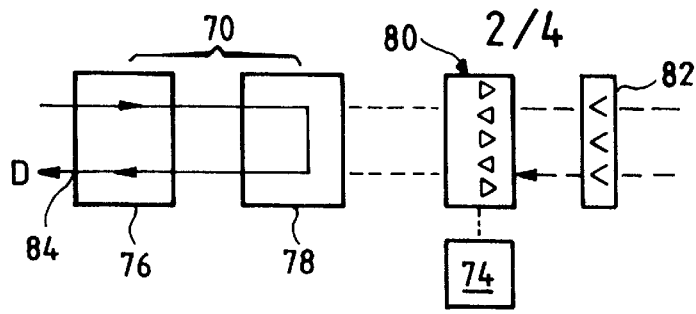
FIG_2a
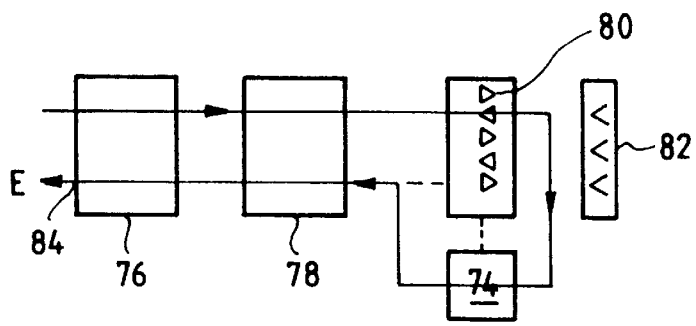
FIG_2b
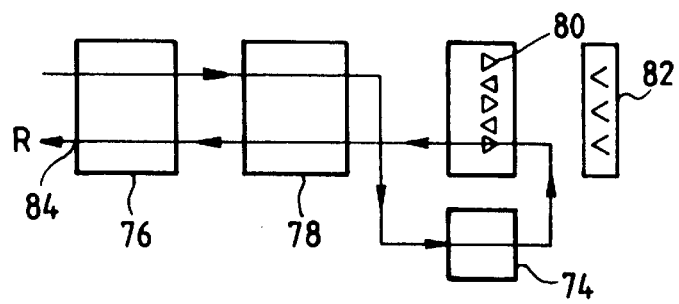
FIG_2c
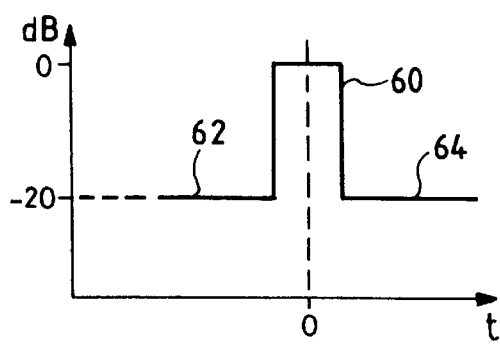
FIG_4
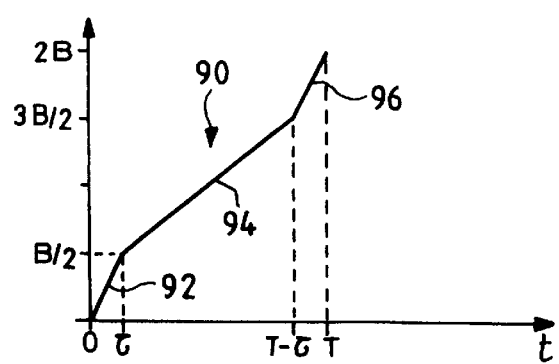
FIG_4a

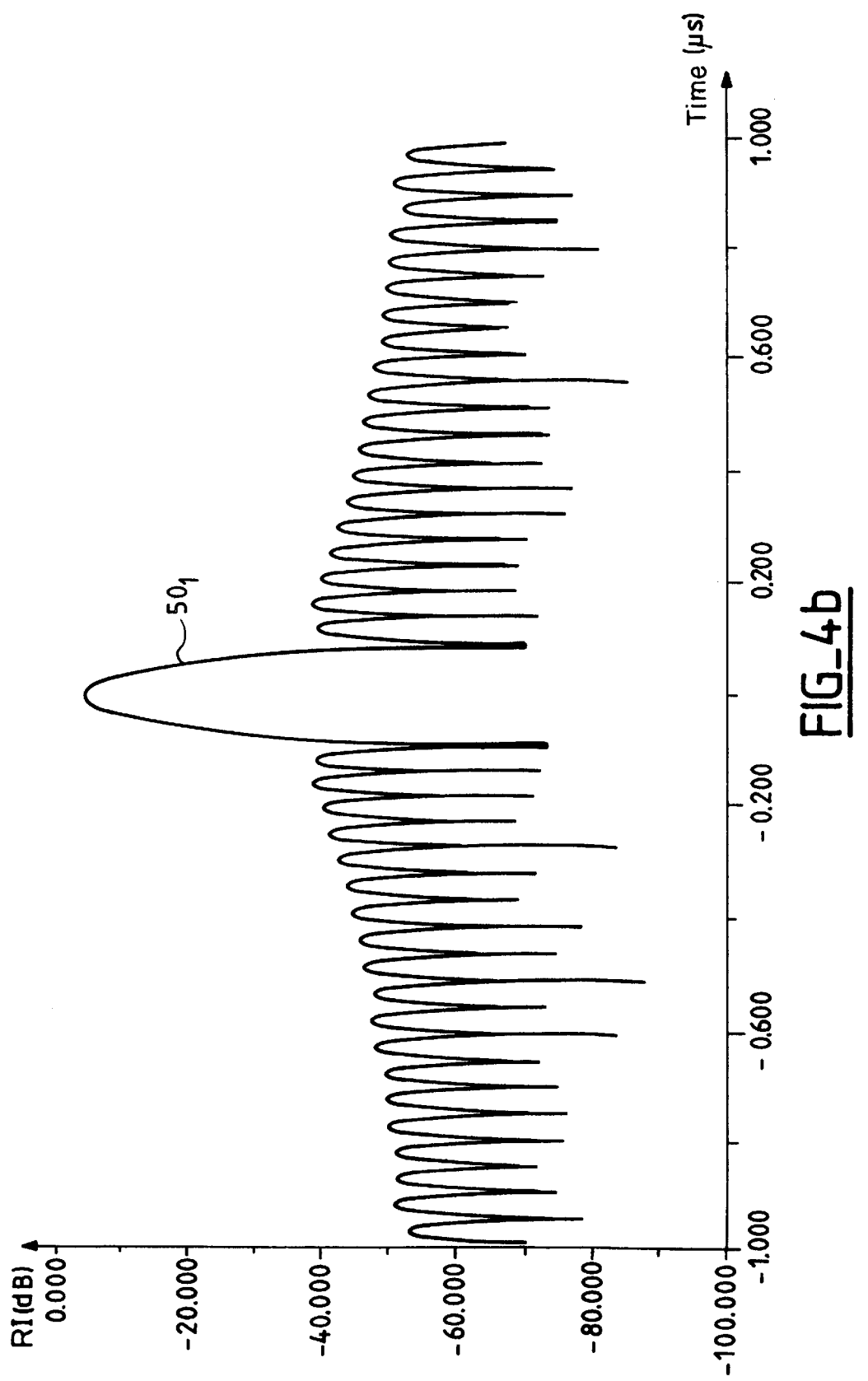
FIG_4b

PULSE COMPRESSION RADAR

The invention concerns pulse compression radar.

BACKGROUND OF THE INVENTION

In radar of this type the frequency of the wave transmitted towards the target varies as a function of time, for example in a linear fashion. To avoid degrading the distance resolution on reception, the wave is time compressed. The filter applying this compression uses a signal which is often called a "replica".

The replica determines the performance of the radar, which is usually characterized by its impulse response. Impulse response is the response of the instrument when the signal is transmitted towards an isolated point target, without interference. Impulse response in the time domain RI(t) has the value:

$$RI(t)=s(t)*r(t),$$

where S(t) is the transmitted signal as a function of time, r(t) is the replica and * is the convolution product.
In the frequency domain:

$$RI(f)=S(f){\cdot}R(f)$$

where S(f)=F(s(t)) is the spectrum of the transmitted signal and R(f)=F(r(t)) is the spectrum of the replica.

In the conventional case of a matched filter, which maximizes the signal to noise ratio:

$$R(t)=s*(t)$$

where s*(t) is the complex conjugate-of the signal s(t).

In this case, the impulse response is a sinc function (sin t)/t having an active central peak and secondary lobes that must be attenuated or eliminated as they degrade the quality of radar measurements because they can be interpreted as false targets and reduce commensurately the energy contained in the active main lobe. The usual method of attenuating the secondary lobes of the impulse response is to multiply the replica by a weighting function.

However, weighting widens the main lobe and reduces its amplitude maximum. Widening (increase in duration) degrades resolution, and reduction in amplitude degrades signal to noise ratio. To obtain the required resolution and signal to noise ratio, degradation is compensated by increasing the transmitted frequency band and transmitter power. The radar is therefore complex and costly. Also, the far lobes, also known as Fresnel lobes, are not attenuated significantly because the level of these lobes is −20.log (BT)+3 dB away from the maximum of the main lobe, B being the bandwidth of the transmitted signal and T the duration of the transmitted pulse.

To attenuate the Fresnel lobes, the transmitted signals depart from a signal with simple linear variation of frequency. This also increases the complexity of the radar because it increases the bandwidth of the signals transmitted and received.

OBJECTS AND SUMMARY OF THE INVENTION

The invention remedies these drawbacks by synthesizing the replica from the required impulse response.

In other words, the required impulse response (in the time domain) is fixed a priori, i.e. the attenuation of the secondary lobes, the level of the Fresnel lobes and the other parameters of the impulse response are all fixed in accordance with the required performance. The replica is obtained digitally from the Fourier transform of the required impulse response in the time domain.

A discrete Fourier transform algorithm is preferably used, such as a fast Fourier transform (FFT) algorithm.

The Fourier transform of the required impulse response provides a spectrum that is usually unlimited, i.e. that extends to infinity. In practice it is therefore necessary to select the frequency band retained after taking the Fourier transform. It is possible either to make do with the active band (determined by the required resolution), or else to include areas outside the active area to enhance the possibilities of forming an impulse response that meets the objective. The bandwidth increase lies in the range 10% to 100%, for example. The bandwidth increase must be limited because it increases the noise band and degrades the signal to noise ratio commensurately.

The method in accordance with the invention of synthesizing the replica is not limited to a particular bandwidth for the signal to be transmitted. It is compatible with conventional transmitted signals with linear frequency variation and with wider bandwidth signals corresponding to a non-linear frequency/time law.

Because the replica must be multiplied by the spectrum of the signal received by the radar and this signal is necessarily affected by the inevitable distortion introduced by the instrument, it has been found that to obtain a correct impulse response it is preferable to allow for such distortion in determining the replica.

This is why, in the preferred embodiment of the invention, the instrument is calibrated and the calibration signal is used to calculate the replica.

To this end, a calibration impulse response is determined, the spectrum is calculated and its inverse is multiplied by the Fourier transform (spectrum) of the required impulse response.

Calibration can be performed in various ways. In a first example, distortion is measured after the transmitted signal has passed through the receive subsystem. The calibration signal is then sampled and digitized.

The distortion is measured periodically, for example at intervals of one minute or each time the radar is started up, in order to adjust the replica periodically.

In a second example, which can be combined with the first, calibration is performed by estimation, i.e. by calculation. To this end the measurements concerning the various units of the radar or the predicted performance are combined by calculation to obtain an estimate of the signal in the form required after passing through all of the radar.

The performance of the radar depends equally on the accuracy and frequency with which the calibration pulse is calculated, because any degradation seen by the active signal but not by the calibration signal cannot be fed into the calculation of the replica and therefore degrades the impulse response. The calibration method must therefore be chosen so that non-calibrated distortion enables the impulse response to satisfy the imposed conditions, i.e. to meet the specifications.

The invention applies not only to pulse compression radar but also to radar coherent over a plurality of pulses, such as synthetic aperture radar (SAR). In the foregoing description and in the following description the term "pulse compression radar" must be understood as referring not only to radar of this type but also to coherent radar in which the received signal is subject to frequency variation (linear or otherwise) pulse by pulse, as is the case with the Doppler effect in synthetic aperture radar during passage of the echo transversely to the antenna lobe as a consequence of movement of the moving body carrying the radar. In this latter case the distortion measured by the calibration pulse consists in the errors occurring during the integration time for a plurality of pulses.

BRIEF DESCRIPTION OF THE DRAWINGS

Other features and advantages of the invention become apparent from the following description of certain embodiments of the invention given with reference to the accompanying drawings, in which:

FIG. 1 is a block diagram representing a method in accordance with the invention of synthesizing a replica, FIGS. 2a to 2c are block diagrams showing one way of determining a calibration pulse in the method from FIG. 1, FIG. 3 is a block diagram of radar in accordance with the invention using the replica determined by the method shown in FIG. 1, FIG. 4 is a diagram of a template used in the method of the invention, FIG. 4a shows one example of modulation of the transmitted signal, FIG. 4b is a graph showing the impulse response obtained with a conventional weighted replica.

MORE DETAILED DESCRIPTION

Figure 4C:
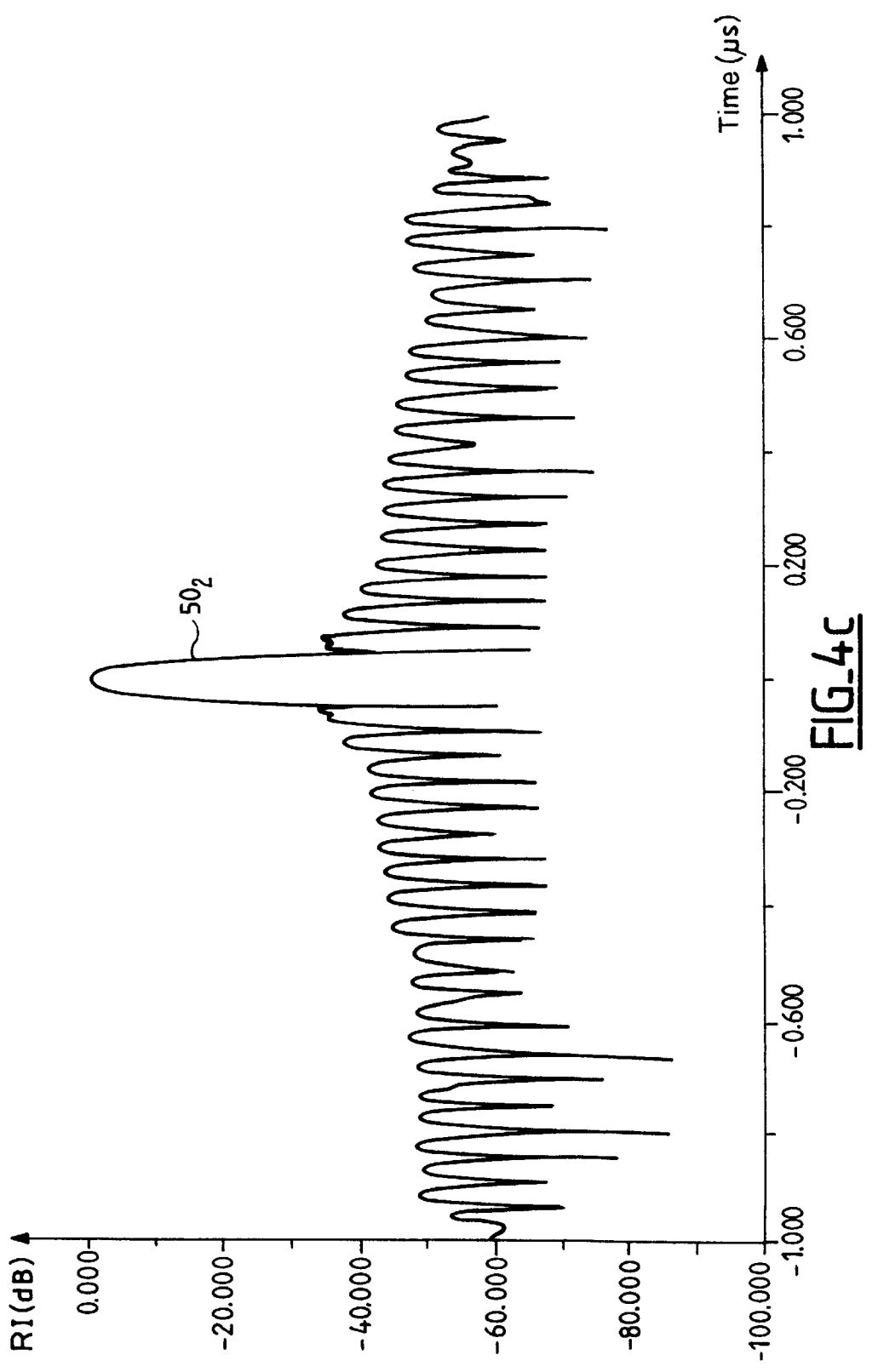
FIG. 4c is a graph showing an impulse response obtained with a replica in accordance with the invention.

The frequency reference R(f) which will be used in the compression filter and which is characterized by a complex function of the frequency f is synthesized by the method shown in FIG. 1.

To this end, the starting point (block 10) is a conventional (possibly weighted) sinc function impulse response, for example, which corresponds to a transmitted signal without distortion whose frequency varies as a linear function of time, i.e. an ideal "chirp". This conventional impulse response, which is a function of time, is a digital signal.

Next (block 12), a template is applied to the conventional impulse response with the aim of attenuating the secondary, far and diffuse lobes in accordance with the accuracy required of the radar.

FIG. 4 shows an illustrative example of a template indicating the objective with an impulse response whose main lobe is that of the ideal impulse response (RI) in terms of sinc(t) (sinc function) and whose secondary lobes are equal to those in terms of sinc(t) less 20 dB. The template therefore has a rectangular central part 60 and side parts 62 and 64 which are 20 dB below the central part.

Applying the template (block 14) yields the required impulse response $RI_{obj}(t)$, that is to say:

RI ideal (t)×Temp(t).

Because the replica is a function of frequency, the Fourier transform of the function $RI_{obj}(t)$ is taken, as shown by block 16. In this example a fast Fourier transform (FFT) is used.

The function $RI_{obj}(f)$ when the Fourier transform has been taken (block 18), which is a spectrum, is divided by the spectrum $S_{cal}(f)$ of a calibration pulse (block 20).

The calibration pulse spectrum $S_{cal}(f)$ is determined (block 24) by taking the fast Fourier transform (block 23) of a measured and/or estimated calibration pulse (block 22).

One example of calibration pulse measurement is described with reference to FIGS. 2a to 2c.

Each of FIGS. 2a, 2b and 2c shows the main parts of the instrument, namely a radar platform 70, an antenna module 72 and a RF signal distribution (beam-forming) network 74.

The radar platform 70 comprises a digital module 76 which generates the transmitted signal and samples it on reception and an RF module 78 which effects the frequency change and amplification. These two modules are used for transmission and reception. For transmission module 76 supplies an intermediate frequency signal to module 78 and for reception module 78 supplies an intermediate frequency signal to module 76.

The active antenna 72 comprises a section 80 of active transmit and receive modules and a set of radiating elements 82. Module 74 samples or injects RF signals into the antenna during calibration.

A process made up of three steps is used to determine the calibration pulse in an instrument of the above kind.

During the first step, shown in FIG. 2a, the signal transmitted by the radar passes only through modules 76 and 78, in both directions. A signal $S_D(f)$ having the following value is therefore obtained at the receive output 84:

$$S_D(f) = S1(f) \times S2(f)$$

In the above equation S1(f) is the contribution to the distortion of modules 76 and 78 in the transmit channel and S2(f) is the contribution of modules 76 and 78 in the receive channel.

The transmit channel of the instrument is calibrated during a second step shown in FIG. 2b. To this end the transmitted signal passes through modules 76 and 78, the components of section 80 concerned with transmission, the network 74 and then modules 78 and 76 again.

In this case a signal SE(f) having the following value is obtained at output 84:

$$S_E(f) = S1(f) \times S_E ant(f) \times S2(f)$$

In the above equation S1(f) and S2(f) have the same meaning as in FIG. 2a described above and $S_E$ant(f) corresponds to the distortion introduced on transmission by the antenna 80 and the network 74.

During the third step, shown in FIG. 2c, the transmitted signal passes first through modules 76 and 78, then network 74, then the components of the section 82 dedicated to reception and finally modules 78 and 76 to output 84.

In this case a signal $S_R(f)$ satisfying the following equation is obtained at output 84:

$$S_R(f) = S1(f) \times S_R ant(f) \times S2(f)$$

In the above equation $S_R$ant(f) corresponds to the distortion introduced in this receive mode by network 74 and by the components of section 80 concerned with reception.

The calibration pulse $S_{cal}(f)$ then has the value:

$$S_{cal}(f) = \frac{S_E(f) \times S_R(f)}{S_D(f)} = S1(f) \times S2(f) \times S_E ant(f) \times S_R ant(f)$$

Thus it can be seen that the calibration pulse allows for the distortion introduced on transmission and reception by modules 76 and 78, the antenna module and network 74.

However, this calibration is not perfect because it does not allow for all distortion, in particular distortion that can be introduced downstream of the components of section 80. However, experience shows that this type of calibration gives satisfactory results.

In the case of radar in which successive coherent pulses are compressed (for example synthetic aperture radar), the calibration or estimation operation consists in measuring the variation in amplitude and phase of the received signal pulse by pulse. This variation is multiplied by a signal S(t) which is the ideal signal sampled at the pulse frequency (for example a "chirp" with a bandwidth equal to the Doppler bandwidth for synthetic aperature radar). The replica is then synthesized as described with reference to FIG. 1.

The synthesized replica R(f) is used in the conventional way to obtain the response of the radar, as shown in FIG. 3 (block 20):

The active signal is first digitized. The digitized active signal is represented by the function S(t) (block 30). The fast Fourier transform of signal S(t) is then taken (block 32) to obtain signal S(f) to be compressed, which is a spectrum (block 34).

To compress the signal, the spectrum S(f) is modified by the synthesized replica R(f) (block 36). This yields the spectrum: RI(f)=R(f)×S(f)

The inverse fast Fourier transform of the compressed signal is then taken (block 38) to obtain the impulse response of the radar in the time domain (block 40).

Results obtained with pulse compression radar in accordance with the invention where the transmitted signal corresponds to a "chirp" with two discontinuities as shown in FIG. 4a will now be described. The FIG. 4a diagram represents the variation over a frequency band 2B and as a function of time t of the frequency modulation of the signal transmitted during a time interval T.

The diagram 90 includes a first segment 92 between times 0 and $\pi$ ($\pi$ is small compared to the duration T of the transmitted pulse), a second segment 94 between times $\tau$ and T−$\tau$ having a slope less than the slope of the straight line segment 92, and finally a third segment 96 between times T−$\tau$ and T which is a straight line segment having the same slope as the first segment 92.

The FIG. 4b diagram shows the impulse response obtained with a conventional replica equal to the conjugate of the transmitted signal, perfect calibration and a Hamming weighting coefficient of 0.58.

FIG. 4c shows the impulse response obtained with a synthesized replica in accordance with the invention, the template imposed on the secondary lobes and on the diffuse lobes during synthesis being in the same order of magnitude as the 0.58 Hamming weighting, as shown in FIG. 4b.

In FIGS. 4b and 4c time in microseconds is plotted on the abscissa axis, the origin corresponding to the peak of the main lobe $50_1$ or $50_2$.

The main lobe $50_2$ of the invention (FIG. 4c) is narrower than the conventional main lobe $50_1$ (FIG. 4b) An improvement in resolution in the order of 35% is obtained, the expansion factor being reduced from 1.2 to 0.89. The resolution is the ratio between the expansion factor and the bandwidth B of modulation of the transmitted signal (FIG. 4a).

Also, with the invention, the signal to noise ratio is improved approximately 1 dB.

For identical performance in terms of resolution, link balance and secondary lobe levels for a point target, with the invention it is possible to obtain a 35% reduction in the band transmitted, a 25% reduction in transmitter power and in power consumption and improved contrast of a point target relative to a diffuse target, and therefore improved probability of detection.

The main lobe being 35% narrower, the required resolution is obtained using a band B1 such that:

$B_1 = B_{conventional} \times 0.65$, because the resolution is inversely proportional to the transmitted bandwidth.

Similarly, instead of exploiting the 1 dB improvement in the signal to noise ratio obtained by the processing method, it is possible, for the same performance in terms of signal to noise ratio (SNR), to reduce the average power transmitted (and therefore power consumption) by 25%, comparing radar using the principle of the invention to radar with conventional processing.

Also, as the main lobe is not attenuated, the contrast between the point target (main lobe) and diffuse target (noise floor) is increased commensurately, which improves detection performance.

The method of the invention applies to any type of pulse compression or coherent radar and in particular to imaging radar, rainfall radar, altimeters, wind diffusion meters, etc. Imaging radar (SAR) is pulse compression radar in terms of range (the chirp is in the transmitted pulse) and azimuth, i.e. along the speed vector, in the coherent integration time corresponding to traversing the antenna diagram.

Rainfall radar can use the pulse compression technique provided that the technique adopted guarantees a very low level of the secondary lobes, typically −60 dB, to prevent pollution of rainfall echoes by ground echoes. Pulse modulation of the type shown in FIG. 4a is then employed.

Wind diffusion meters are also compression radars on the range axis to improve the link balance.

Similarly, altimeters are compression radars on the range axis.

In all these radars optimization necessitates a compromise between the impulse response parameters (resolution, level of secondary lobes), radar parameters (bandwidth, pulse duration, signal to noise ratio) and compression algorithms.

Table I below is a comparative table showing the performance obtained from radar conforming to the invention (synthesized replica) having in-band undulation type distortion and the performance obtained with a weighted but uncalibrated replica and with a calibrated conventional replica, to which a 0.58 Hamming weighting coefficient is applied.

Compared to uncalibrated or calibrated replica pulse compression radars, the level of the main peak is considerably improved, i.e. the signal to noise ratio is improved, and resolution and ISLR also show a clear improvement.

TABLE I

| RI parameter | Non-calibrated replica | Calibrated "conventional" replica | Synthesized replica |
| --- | --- | --- | --- |
| Main peak level | −4.9 dB | −4.7 dB | 0 dB |
| Resolution expansion factor | 1.2 | 1.2 | 0.89 |
| ISLR | 17.2 dB | 19.6 dB | 25.6 dB |
| PSLR | 19.8 dB | 34.3 dB | 34 dB |
| SSLR | 41.6 dB | 43 dB | 44.9 dB |

In the above table, ISLR signifies "Integrated Side Lobe Ratio" and conventionally corresponds to a ratio between the energy in the central lobe (between the maximum and −3 dB) and the energy outside the central lobe.

PSLR signifies "Peak Side Lobe Ratio" and corresponds to the distance in dB between the maximum of the main lobe and the maximum of a secondary lobe in a particular window around the main peak.

SSLR signifies "Spurious Side Lobe Ratio" and corresponds to the distance in dB between the maximum of the main lobe and the maximum of a secondary lobe outside the aforementioned window.

A second example uses radar transmitting a conventional chirp, i.e. linear frequency modulation of the transmitted signal with a band B—20 MHz and a duration T 25 µs, the sampling frequency being 1.1 B on the output side of an anti-aliasing filter.

Table II below compares radar with an impulse response obtained in the conventional way and radar of the invention with a synthesized impulse response.

TABLE II

| RI parameter | "Conventional" RI 0.58/0.65 Hamming | "Synthesized" RI + 0.65 Hamming |
|---|---|---|
| Losses on main peak (associated with weighting) | 1 dB/0.6 dB | 0.6 dB |
| Resolution expansion factor | 1.2/1.1 | 1.1 |
| PSLR | 34.3 dB/26.8 dB | 33 dB |
| ISLR | 19.7 dB/19 dB | 19.9 dB |
| SSLR | 43.3 dB/38 dB | 43.6 dB |

In the conventional radar two Hamming weighting coefficients were considered, one of 0.58 and the other of 0.65. In the case of the invention, the impulse response was synthesized from an impulse response in the time domain obtained by the conventional method with a Hamming weighting coefficient of 0.65 and a 20 dB attenuation template on the secondary lobes and with the band of the replica limited to 1.1 times the band B of the transmitted chirp.

Table II shows that the synthesized impulse response had secondary lobes below 33 dB, i.e. substantially at the same level as those obtained with conventional Hamming weighting and a coefficient of 0.58. The loss on the signal to noise ratio and the degraded resolution were practically identical to those obtained with a conventional method and a Hamming coefficient of 0.65.

Table II shows clearly that with a single coefficient the invention combines the advantages obtained with conventional 0.58 and 0.65 weighting coefficients without their disadvantages.

We claim:

1. A method of synthesizing a replica used in the compression filter of pulse compression radar wherein the replica is calculated from a required impulse response, wherein the required impulse response is obtained from an analytic function such as a sinc function or a weighted sinc function and from a template, wherein calibration signals of the instrument are used to calculate the replica, and wherein the replica is defined by the following equation:

$$R(f) = RI_{obj}(f)/S_{cal}(f)$$

in which $RI_{obj}(f)$ is the spectrum of the required impulse response and $S_{cal}(f)$ is the spectrum of a calibration signal, in particular a calibration pulse.

2. A method according to claim 1, wherein, in the required impulse response spectrum, an upper frequency band of approximately 10% to 100% of the active band is adopted to obtain the required resolution.

3. A method according to claim 1, wherein a calibration signal or pulse is used to synthesize the replica which is measured and/or estimated and which represents the distortion introduced by the radar.

4. A method according to claim 3, wherein the replica is periodically measured and/or estimated in order to adjust it periodically.

5. A method according to claim 3, wherein measuring the calibration pulse consists in acquiring a signal that has passed through the transmit and receive subsystems of the radar.

6. A method according to claim 2, wherein the spectrum of the required impulse response is obtained by applying a discrete Fourier transform algorithm to the required impulse response in the time domain.

7. Application of the method according to claim 1 to coherent radar over the time to integrate a plurality of pulses.

* * * * *